United States Patent [19]

Mori et al.

[11] Patent Number: 5,379,380
[45] Date of Patent: Jan. 3, 1995

[54] SYSTEM WITH DEDICATED BUFFERS CONNECTED TO RESPECTIVE I/O DEVICES FOR CONTINUOUS PROCESSING OF DIGITAL DATA

[75] Inventors: Yoshihiro Mori, Hirakata; Koichiro Endo, Osaka; Kisoko Suzuki, Neyagawa; Hidemasa Kitagawa, Toyonaka, all of Japan

[73] Assignee: Matsushita Electric Industrial Co., Ltd., Osaka, Japan

[21] Appl. No.: 500,545

[22] Filed: Mar. 28, 1990

[30] Foreign Application Priority Data

Mar. 28, 1989 [JP] Japan .................. 1-77563

[51] Int. Cl.⁶ .................. G06F 3/05; G06F 3/16
[52] U.S. Cl. .................. 395/275; 395/425; 395/600; 358/335; 360/14.1; 364/967.1; 364/237.8; 364/239.7; 364/242.4; 364/243; 364/DIG. 1
[58] Field of Search .............. 364/DIG. 11, DIG. 12; 395/425, 600, 275; 358/335; 360/14.1

[56] References Cited

U.S. PATENT DOCUMENTS

| | | | |
|---|---|---|---|
| 4,211,997 | 7/1980 | Rudnick et al. | 371/37.7 |
| 4,394,774 | 7/1983 | Widerglen et al. | 382/56 |
| 4,636,946 | 1/1987 | Hartung et al. | 395/425 |
| 4,829,473 | 5/1989 | Keller et al. | 364/900 |
| 4,876,597 | 10/1989 | Roy et al. | 358/141 |
| 4,974,178 | 11/1990 | Izeki et al. | 364/523 |
| 4,979,050 | 12/1990 | Westland et al. | 360/14.1 |
| 5,057,932 | 10/1991 | Lang | 358/335 |
| 5,079,630 | 1/1992 | Golin et al. | 358/133 |
| 5,093,750 | 3/1992 | Park et al. | 360/19.1 |
| 5,142,677 | 8/1992 | Ehlig et al. | 395/650 |

FOREIGN PATENT DOCUMENTS 0051225 5/1982 European Pat. Off. .
0051259 5/1982 European Pat. Off. .
0268270 5/1988 European Pat. Off. .

OTHER PUBLICATIONS

Patent Abstracts of Japan, vol. 9, No. 22 (p. 406)(2015) 19 Nov. 1985 & JP-A-60 129 987 (Nippon Columbia K.K.) 11 Jul. 1985 *abstract*.

Primary Examiner—Thomas C. Lee
Assistant Examiner—Paul R. Lintz
Attorney, Agent, or Firm—Wenderoth, Lind & Ponack

[57] ABSTRACT

Information which must be continuously inputted or outputted in time, namely, audio and picture information, are inputted and outputted into a file apparatus as the digital data. Conventionally, the continuous inputting and outputting operations of the audio and the picture information and editing operations such as deletion, insertion and so on could not be made compatible and instantaneous. In the present technique an individual size is continuously stored into a storage media physically, and the input and output of the data and the storage reproduction with the storage media are effected in non-synchronization, with the size of an input-/output buffer, a unit of an input/output of the audio and the picture information, and the unit of the editing being the same in size so as to realize instantaneousness and continuous input/output operations of the editing.

4 Claims, 7 Drawing Sheets

Fig. 10

SYSTEM WITH DEDICATED BUFFERS CONNECTED TO RESPECTIVE I/O DEVICES FOR CONTINUOUS PROCESSING OF DIGITAL DATA

BACKGROUND OF THE INVENTION

The present invention generally relates to an apparatus and method for the continuous input or output of digital data which inputs pictures, audio, text and other large amounts of data so as to effect preserving, editing and, manipulating operations for outputting them.

In the present information society, an extensive amount of information exists in various forms. Especially, information such as pictures, audio and text is offered to the public in the forms of broadcasts, newspapers, publications, records and so on. Retrieval of particular information from among the such large amounts of information is a substantial problem.

Substantial developments in computers and their peripheral apparatuses have made it possible to edit, process and store large amounts of information at higher speeds. Apparatuses for processing and storing the information are now smaller in size, lower in price and higher in performance and the cost of the processing operation has been considerably reduced. However, the picture and audio information is fundamentally analog. When such analog information is digitized, the information amount increases substantially thus requiring a storing apparatus of extremely large capacity to process the information. For example, in picture information, 64K bytes are required if 360×240 picture elements and 64 colors are used per picture frame. If the color resolution is improved, several hundreds of K bytes are required. Also, in audio information, for a five second audio output, 100K bytes of information is required at quantization bit and 20 KHz sampling frequency. Furthermore, for moving picture and audio information, the information amount is even more. In order to effect a reproducing operation, the outputting operation must be effected in the real time, and an input/output apparatus is necessary having a large capacity storing apparatus capable of time synchronization at a high speed.

Figure 10:
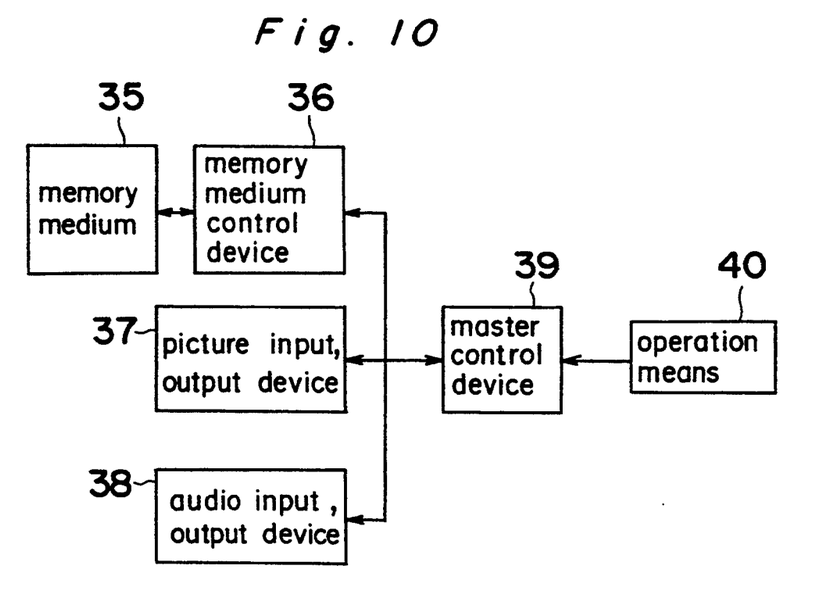
FIG. 10 is a block diagram showing the construction of the conventional embodiment.

In recent years, with the utilization of the mass fixed disk drives and the optical disks capable of recording and reproducing operations, in addition to development of the data and signal compression of various types of picture and audio signals, a large capacity storing apparatus for digitally recording moving picture and audio information has been realized. FIG. 10 shows a block diagram of an information input/output apparatus using such a large capacity apparatus.

In FIG. 10, reference numeral 35 is a mass memory medium capable of recording and reproducing digital information. Reference numeral 36 is a memory medium controlling device which is adapted to control the information input/output to and from the memory medium 35. Reference numeral 37 is a picture input/output device for effecting the mutual conversion from analog picture information to digital picture information and visa versa. Reference numeral 38 is an audio input/output device for effecting conversion from analog audio information to digital audio information and visa versa. Reference numeral 39 is a master controlling device for controlling the memory media controlling device 36, the picture input/output device 37, and the audio input/output device 38. Reference numeral 40 is an operation means for inputting control commands to the master controlling device 39. The information input/output apparatus of FIG. 10 makes it possible to record and reproduce the continuous picture and audio data.

However, it is difficult to edit the continuously recorded information and to reproduce the results in real time. In a case where the recording operation is effected in a separate area, the actual transfer speed of the storage media (such as a fixed disk drive or an optical disk) becomes slower as compared with a case where the recording and reproducing operations are effected in continuous areas. In order to effect a real time reproducing operation, the recording operation must be effected in continuous areas. Information which has not been continued in the area due to editing cannot be reproduced in real time. Therefore, the edited results must necessarily be copied into other continuous areas to effect the reproducing operation in real time. The storage capacity thus becomes wasted, and also the copying time becomes necessary to therefore increase the duration of the editing operation.

SUMMARY OF THE INVENTION

Accordingly, the present invention has been developed with a view to substantially eliminating the above discussed drawbacks inherent in the prior art apparatus and method for the continuous input or output of digital data, and has for its essential object to provide an improved apparatus and method for the continuous input or output digital data taking advantage of the merits of both systems of the prior art apparatuses and methods.

Another important object of the present invention is to provide an improved apparatus for the continuously input or output of digital data, and an improved method for the continuous input or output of digital data, which digitally record and reproduce information necessary to effect the recording and reproducing operations in the real time of the pictures and audio to effect an editing operation.

In accomplishing these and other objects, according to one preferred embodiment of the present invention, an apparatus for the continuous input or output of digital data is composed of a plurality of input/output devices for processing the digital information; a plurality of input/output means for inputting and outputting the digital information with respect to each of the input/output devices; a plurality of memory means being connected respectively with the input/output means, being composed of a memory means management area for storing a given attribute, a plurality of block areas having the same memory capacity to be used in the information transfer among the input/output means and a mutual bus means, a block management area for storing the respective condition of the block areas, and block management registers for the synchronization of the access to the master control means and the memory means of the input/output means; a control input means for inputting the control procedure of controlling the operations of the memory means; a master control means for controlling the memory means and the control input means; a bus means having the memory means, the control input means and the master control means mutually connected so as to transfer the digital information.

By the above-described construction, in a control input step, the master control means stores the transfer information onto the block management area of the memory means of the transmitter, and onto the block management area of the memory means of the transfer destination in accordance with the transfer control from the controlling means. An input/output step for effecting the information input into the block area of the transmitter from the input/output device of the transmitter by the input/output means of the transmitter is started by the use of the block management register of the transmitter. The input/output means of the transmitter transmits the completion of the input/output step for effecting the information inputting operation into the master control means by the use of the block management register of the transmitter. By way of the bus means, the master control means performs the information transfer step for effecting the information transfer operation between the block areas into the block area of the transfer destination from the block area of the transmitter. By the use of the block management register of the transfer destination, an input/output step for effecting the information output into the input/output devices of the transfer destination from the block area of the transfer destination by the input/output means of the transfer destination is started. The transfer destination input/output means uses the block management register of the transfer destination to transfer the completion of the input/output step for effecting the information outputting operation into the master control means so as to effect the information transfer between two input/output devices.

In the present invention, the independent input/output means and memory means are connected respectively with the input/output devices. Thus, it is possible to perform a plurality of input/output steps and information transfer steps at the same time. Therefore, the information transfer of the high speed is realized. Also, if the time when the information transfer cannot be performed exists when the recording means from between the input/output devices changes the area for recording and reproducing the information as in the case of the fixed disk drive, the capacity of the block area is made the capacity capable of compensating the time, and the inputting and outputting operations are performed in a unit of the capacity of the block area. Even in a case where the information is stored scatteringly on the memory means by the storing, without fail, of the capacity of the block area into the physically continuous positions, by the memory means, the necessary transfer speed is ensured, thus realizing the input/output continuous in time. Also, although the synchronizing operation is difficult to effect if the capacity of the same block area is used when the information different in the transfer speed is inputted and outputted at the same, the block area is further divided into specialization and into a plurality of record areas and unused areas so as to turn the transfer speed of one block area into the sample integer ratio so that the synchronizing operation may be easily effected. Furthermore, by the use of the record area, the handling operations such as information transfer, duplication, deletion and so on may be easily effected in much smaller units. Also, as the respective input, output devices are recognized through the memory means from the master control means, the input/output devices may be easily extended, because the controlling method of the master controlling means is useless in change if the controlling method of the input, output means is varied. Therefore, it is possible to cope with the transfer operation of the high speed by the parallel use of the input/output devices.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
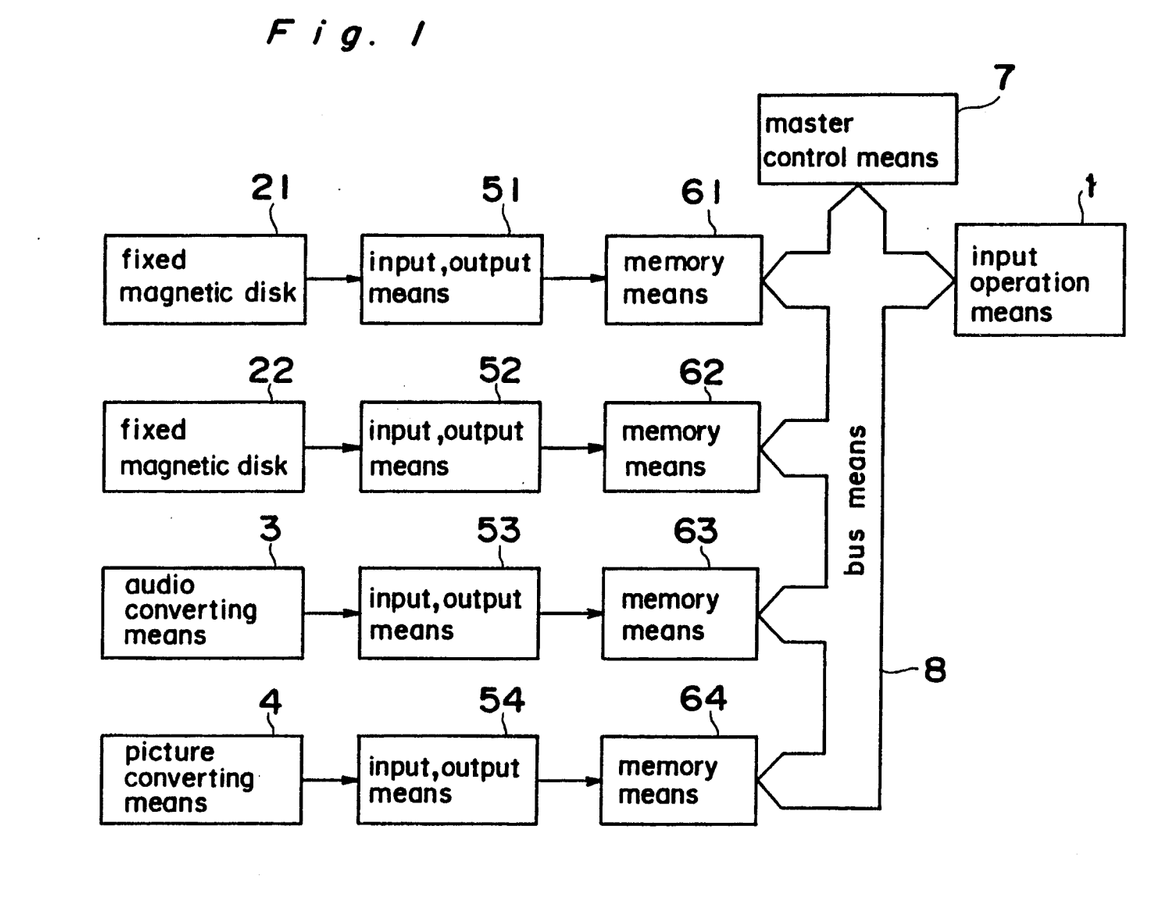
FIG. 1 is a block diagram showing the construction of the embodiment of the present invention.
Figure 2:
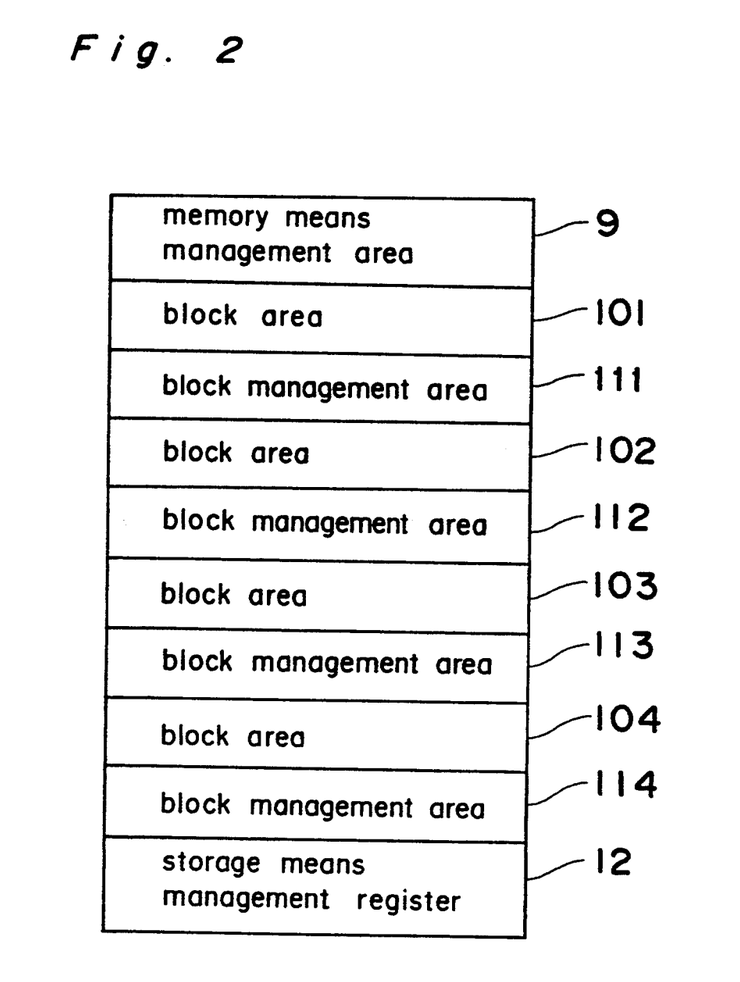
FIG. 2 is a block diagram of a memory means in the same embodiment.
Figure 3:
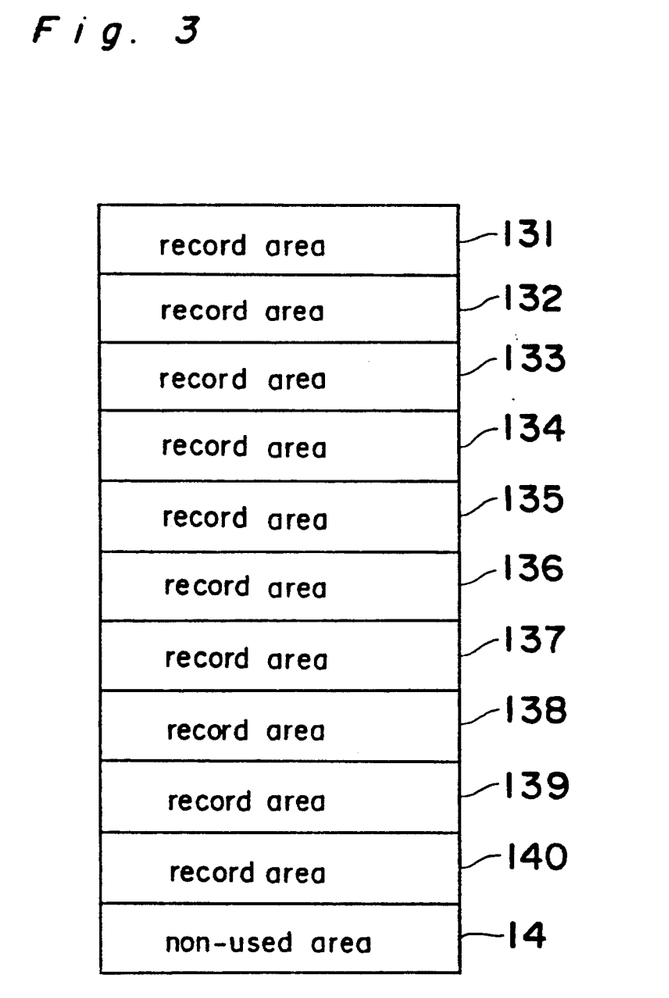
FIG. 3 is a block diagram of block areas.
Figure 4:
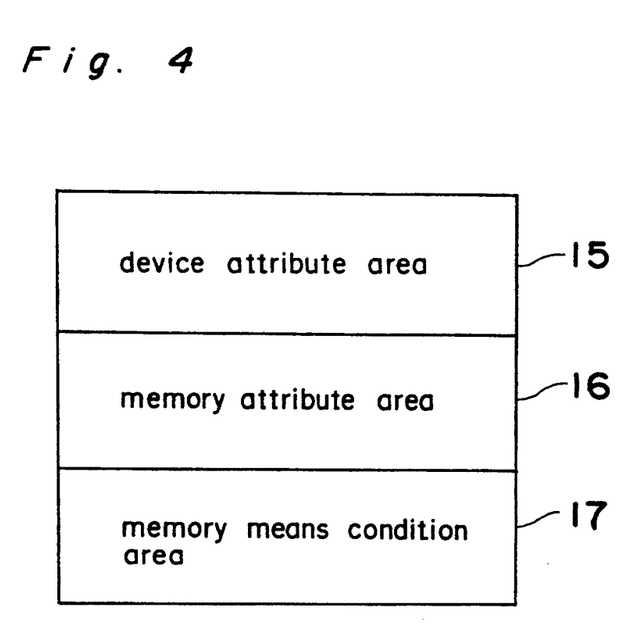
FIG. 4 is a block diagram of memory means management areas.
Figure 5:
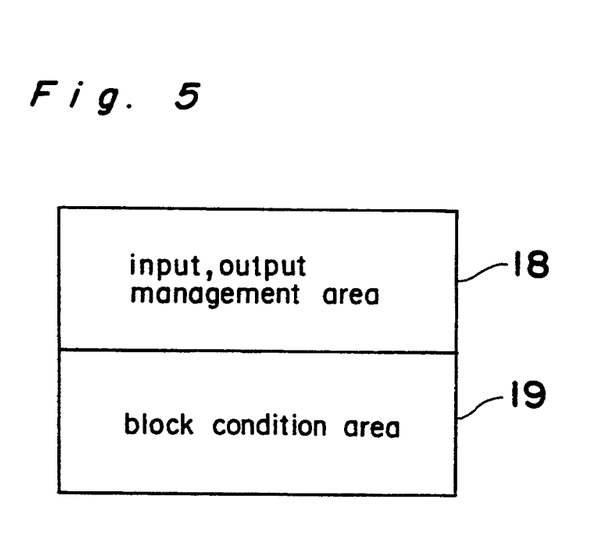
FIG. 5 is a block diagram of block management areas.
Figure 6:
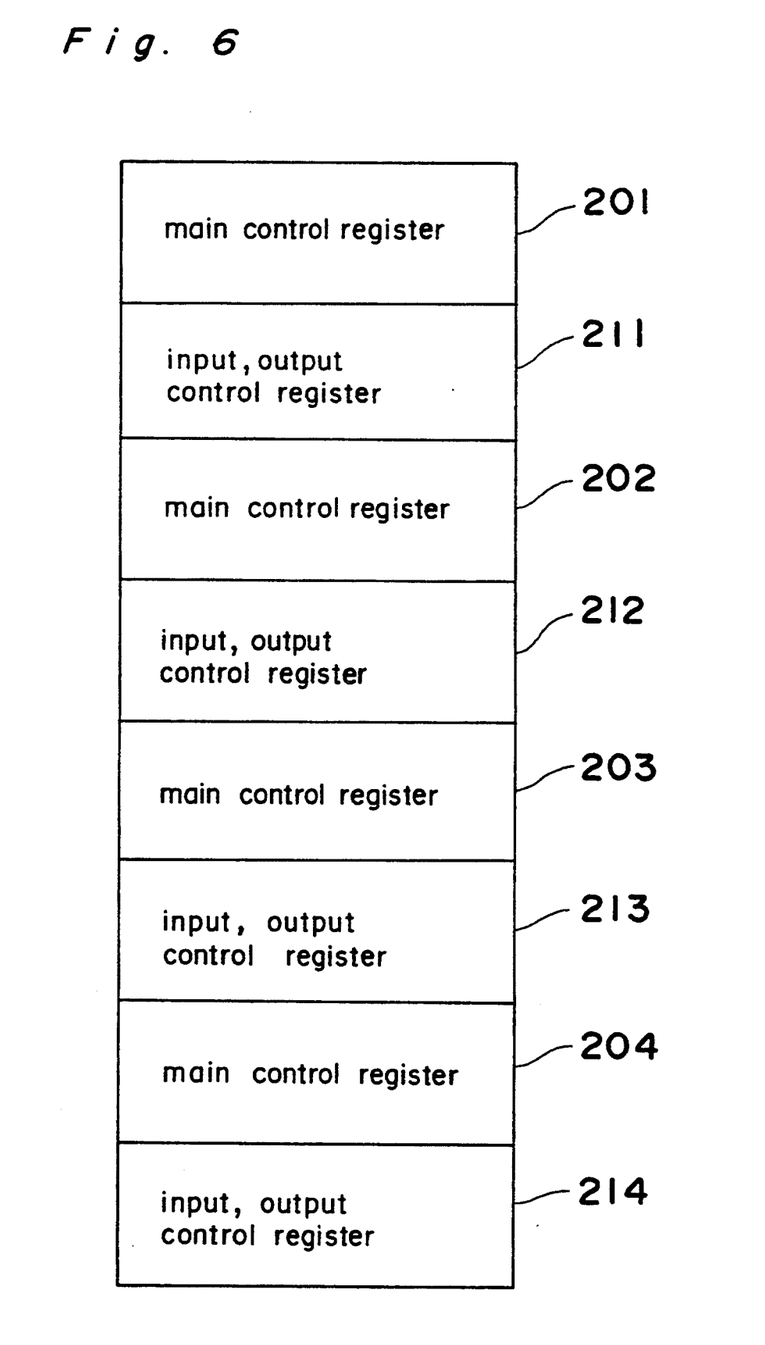
FIG. 6 is a block diagram of block management registers.

Referring now to the drawings, there is shown in FIG. 1, an apparatus for continuously inputting or outputting digital data according to a first embodiment of the present invention, which includes a input operation means 1 for inputting a control procedure, fixed disk drives 21 and 22 for storing digital information, an audio converting means 3 for mutual conversion of the analog audio information and the digital audio information, a picture converting means 4 for mutual conversion of the analog picture information and the digital picture information, input/output means 51 through 54 for controlling the inputting and outputting operations of digital information with respect to the fixed disk drives 21 and 22, the audio converting means 3, and picture converting means 4, memory means 61 through 64 for storing the digital information inputted and outputted with respect to each of the input and output means 51 through 54, a master control means 7 for transferring the digital information among the memory means 61 through 64, and for writing control information for controlling the input/output means 51 through 54 onto the memory means 61 through 64, and a bus means 8 having the input operation means 1, the master control means 7, and the memory means 61 through 64 connected thereto for effecting information transfer operations. FIG. 2 is a block diagram of each memory means 61 through 64, which includes a memory means management area 9 for storing attributes of the device connected with the respective input/output means 51 through 54, the attributes of the construction of the respective input/output means 51 through 54 and the construction of the respective memory means 61 through 64 and so on, block areas 101 through 104 to be used for information transfer between the respective input/output means 51 through 54 and the bus means 8, block management areas 111 through 114 for describing the respective conditions of the block areas 101 through 104 and the control information into the input/output means 51 through 54, and a block management 12 for synchronizing the operations of the master control means 7 and the input/output means 51 through 54. FIG. 3 is a block diagram of the block areas 101 through 104, which include record areas 131 through 140 for storing the digital information to be actually used, and a unused area 14. FIG. 4 is a block diagram of the memory means management area 9, which includes a device attribute area 15 showing the attribute of the device to be connected with the input/output means 51 through 54, a memory means attribute area 16 showing the construction of the memory means 61 through 64, and a memory means condition area 17 for showing the entire condition of the memory means 61 through 64. The type of the devices, the access method, the storage amount and so on are described in the device attribute area 15. In the present embodiment, the devices include a fixed disk drive, an audio input/output, and a picture input/output. The access method includes random access and sequential access. The storage capacity of the fixed disk drive is approximately 380M bytes. In the memory attribute area 16, there are stored the capacity of one memory means 61–64, the number of the block areas 101 through 104 to be included in one memory means 61 through 64, the capacity of one block area 101 through 104, the number of the record areas 131 through 140 to be included in one block area 101 through 104, the capacity of the one record area 131 through 140, and so on. In the memory means condition area 17, there are stored flag information as to whether or not the memory means management area 9 may be read from the master control means 7, whether or not the master control means 7 may rewrite the memory means management area 9, whether or not the memory means management area 9 has been rewritten, and the like. FIG. 5 is a block diagram of the block management areas 111 through 114, which include an input/output control area 18 for storing the control information into the input/output means 51 through 54, and a block condition area 19 for storing the condition of the block area 101 through 104 to be managed. In the input/output control area 18, there are stored an input/output control instruction for describing the operation with respect to the device of the input/output means 51 through 54, an input/output position parameter for specifying the position of the information within the device, and so on. The block management area 111 is to manage the block area 101, the block management area 112 is to manage the block area 102, the block management area 113 is to manage the block area 103, and the block management area 114 is to manage the block area 104. In the block condition area 19, there are stored the storage condition information showing the number of areas the information is stored in among the record areas 131 through 140 of the block areas 101 through 104 managed by the block management area 111 through 114, transfer destination information showing which device the information should be transferred into, a status information showing whether or not the block area 101 through 104 is in access at the present time, and so on. FIG. 6 is a block diagram of a block management register 12, which includes master control registers 201 through 204 which indicated that the master control means 7 has written the control information of the block management areas 111 through 114 so as to start the operation into the device of the input/output means 51 through 54, input/output control registers 211 through 214 for informing the master control means 7 that the operation with respect to the device by the input/output means 51 through 54 has been completed. The master control register 201 and the input/output control resister 211 correspond to the block area 101 and the block control area 111, the master control register 202 and the input/output control resister 212 correspond to the block area 102 and the block control area 112, the master control register 203 and the input/output control register 213 correspond to the block area 103 and the block control area 113, and the master control register 204 and the input/output control register 214 correspond to the block area 104 and the block control area 114.

Figure 7:
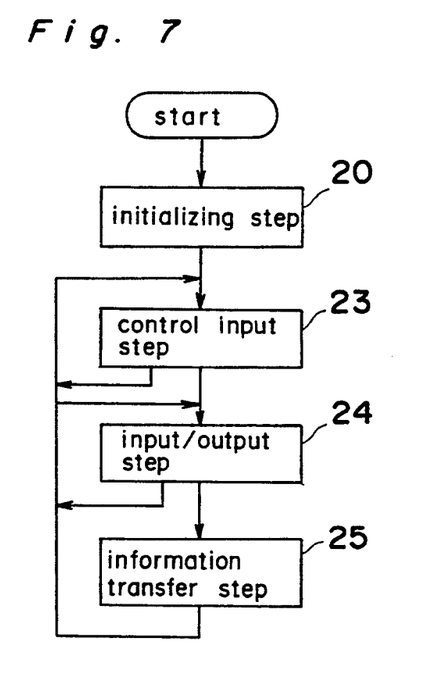
FIG. 7 is a flow chart showing the schematic operations.
Figure 8:
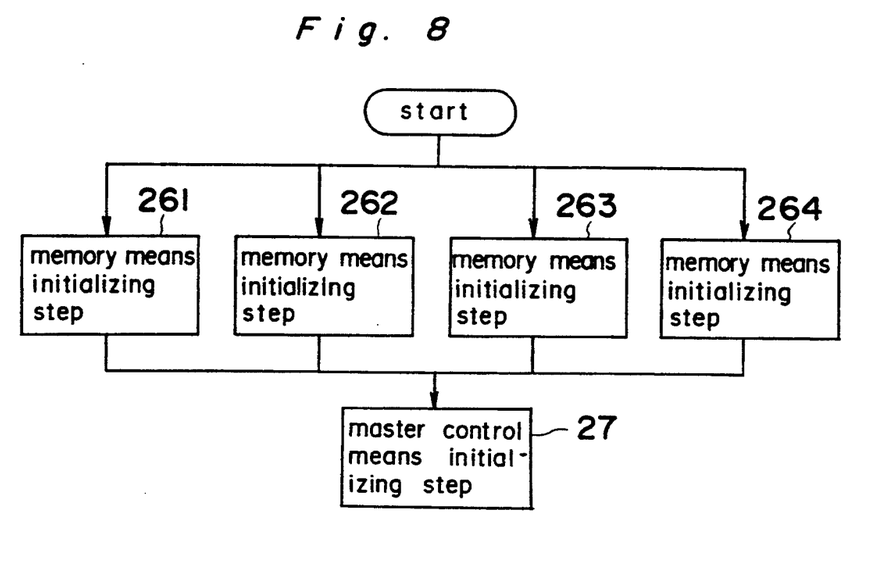
FIG. 8 is a flow chart showing the operations of the initializing step.

The operation of the embodiment of the present invention will be described hereinafter. FIG. 7 is a flow chart showing the schematic operations of the present embodiment, which includes an initializing step 20, a control input step 23, an input/output step 24 and an information transfer step 25. First, an initializing step 21 is performed, the initializing operation is effected, and thereafter the input/output step 24 and the information transfer step 25 are performed in accordance with the operations inputted at the control input step 23. By the controls, the input/output step 24 and information transfer step 25 are repeated a plurality of times from the control input step 23. When the completing control has been inputted at the control step 23, all the operations are completed. FIG. 8 is a flow chart showing the operations of the initializing step 20, which includes a memory means initializing step 261 through 264 for initializing the memory means 61 through 64 by the input/output means 51 through 54, and a master control means initializing step 27 for initializing the master control means 7. In the memory means initializing steps 261 through 264, the device attribute area 15 and the memory means attribute area 16 of the memory means management area 9 of the memory means 61 through 64 corresponding in accordance with the devices of the input/output means 51 through 54 are respectively connected therewith are initialized, the block management areas 111 through 114 are set in the block condition area 19 into the initial condition, namely, the condition where no information is stored in the block areas 101 through 104, no accessing is effected even from the master control means 7, from the input/output means 51 through 54. Also, the master control means 7 is notified of the completion of the memory means initializing step 261 through 264. For the initialization of the operation, at the beginning of the memory means initializing step 261 through 264, the input/output means 51 through 54 makes the input/output control register 211 through 214 into a memory means initialization unfinished code, makes the flag information of the memory means condition area 17 into a memory means access prohibition code, and at the completion of the memory means initializing step 261 through 264, the input/output means 51 through 54 makes the input/output control register 211 through 214 into a memory means initialization completion code, and makes the flag information of the memory means condition area 17 into a memory means access permission code. In the main control means initializing step 27, the master control means 7 waits for the input/output control register 211 through 214 corresponding to the input/output means 51 through 54 to become the memory means initializing completion code, first, for the synchronization with the input/output means 51 through 54. Then, the flag information of the memory means condition area 17 is confirmed to be a memory means access permission code so as to read the memory means management area 9 to recognize the number and attribute of the connected input/output means 51 through 54, and the attribute of the device for initializing the internal condition. Finally, the master control register 201 through 204 is made into the master control means initialization completion code to notify each of the input/output means 51 through 54 of the completion of the master control means initializing step 27. When the input/output means 51 through 54 confirms that the master control register 201 through 204 is the master control means initialization completion code, the input/output control register 211 through 214 is made into a instruction receivable code in preparation for the next control input step 23.

In the control input step 23, the master control means 7 sets each area of the memory means management area 9 of the memory means 6 and the block management area 111 through 114 in accordance with the control inputted from the input operation means 1. When the operation with respect to the device by the input/output means 51 through 54 is necessary, the portion corresponding to the master control register 201 through 204 is made into an operation starting code. In the input-/output step 24, when the input/output means 51 through 54 detects that the master control register 201 through 204 is the operation starting code, the content of the block management area 111 through 114 corresponding to the memory means management area 9 of the memory means 61 through 64, and the master control register 201 through 204 is read to effect the given operation with respect to the connected device. When the operation is completed, the input/output control register 211 through 214 corresponding to the master control register 201 through 204 with the operation starting being established is made into the operation completion code so as to inform the master control means 7 of the input/output operation completion. The information transfer step 25 is performed when the master control means 7 must effect the information transfer from the block area 101 through 104 of the memory means 61 through 64 to the other block area 101 through 104.

Figure 9:
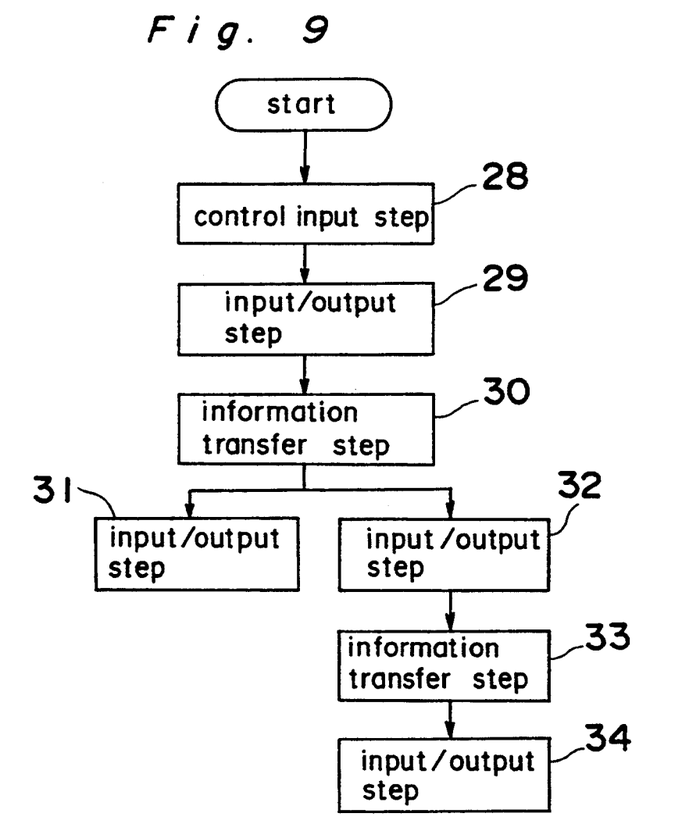
FIG. 9 is a flow chart showing the operations of the information transfer into the audio converting means through the fixed disk drive.

Here, in the control input step 23, the operation in a case where the control for storing the information inputted from the audio converting means 3 onto the fixed disk drive 21 has been inputted will be described with reference to FIG. 9, which includes a control input step 29 for inputting and setting the operation of transferring the information into the fixed disk drive 21 from the audio converting means 3, an input/output step 29 at which the input/output means 53 inputs the information from the audio converting means 3, an information transfer step 30 at which the master control means 7 transfers the information from the memory means 63 to the memory means 61, an input/output step 31 at which the input/output means 53 processes the transfer completion, an input/output step 32 at which the input/output means 51 stores the information onto the fixed disk drive 21, an information transfer step 33 at which the master control means 7 processes the completion of the information output, and an input/output step 34 at which the input/output means 51 processes the transfer completion.

First, in the control input step 28, the master control means 7 selects a block area 101 through 104 showing that the input/output control resisters 211 through 214 of the block management register 12 of the memory means 63 are instruction receivable codes, and the memory condition information of the block condition areas 19 of the block management areas 111 through 114 are the unused, and the status information shows the non-access. Here, the block area 103 has been selected. When the block area 103 is selected, the master control means 7 is in the master control means access of the status information of the block condition area 19 of the block management area 113. Also, the master control means 7, likewise, selects the block area 101 through 104 of the unused, non-access even from the memory means 61. Assume that the block area 102 has been selected here, and the status information of the block condition area 19 of the block management area 112 of the memory means 61 is assumed to be in the master control means access. Now that the status information is in the master control means access like this, the block area 101 through 104 selected by mistake is prevented from being used. Then, the master control means 7 sets the input instruction code into the input/output control instruction of the input/output control area 18 of the block management area 113 of the memory means 63, sets the head position into the input/output position parameter, and also sets the code showing the block area 102 of the memory means 61 into the transfer destination information of the block condition area 19 to put the status information of the block condition area 19 of the block management area 113 of the memory means 63 into the input/output means access permission so as to set the operation starting code into the master control register 203 of the memory means 63. Also, the output instruction code is set into the input/output control instruction of the input/output control area 18 of the block management area 112 of the memory means 61, and the given position code is set into the input/output position parameter.

Then, in the input/output step 29, the input/output means 53 confirms that the status information of the block condition area 19 of the block management area 113 is put into the input/output means access permission when the master control register 203 of the memory means 63 is the operation starting code. Thereafter, the information input into the block area 103 of the memory means 63 from the audio converting means 3 starts, since the input/output control instruction of the input-/output control area 18 is an input instruction code. The information transfer amount at this time becomes a product of the number of the record area 131 through 140, stored in the memory means attribute area 15 of the memory means 63, and the capacity. Namely, the information is not inputted into the unused area 14 of the block area 103. When the input of the information is finished, the input/output means 53 is adapted to apply the memory condition information of the block condition area 19 of the block management area 113 of the memory means 63 as a full information so as to put the input/output control register 213 into the operation completion code after putting the status information into the master control means access permission.

Then, in the information transfer step 30, the master control means 7 confirms that the status information of the block condition area 19 of the block management area 113 is put into the master control means access permission when the input/output control register 213 of the memory means 63 is the operation completion code. Thereafter, as the input/output control instruction of the input/output control area 18 is an input instruction code, the transfer destination from the transfer destination information of the block condition area 19 is recognized to be the block area 102 of the memory means 61, and the information is transferred from the block area 103 of the memory means 63 to the block area 102 of the memory means 61 through the bus means 8. After the transfer completion of the information, the master control means 7 makes the storage condition information of the block condition area 19 of the block management area 113 of the memory means 53 unused, and makes the status information non-access and thereafter, makes the master control register 203 into the initializing completion code. Also, the storage condition information of the block condition area 19 of the block management area 112 of the memory means 51 is adapted as a full information to put the status information into the input/output means access permission, and thereafter puts the master control register 202 into the operation starting code.

Then, in the input/output step 31, the input/output means 53 turns the input/output control register 213 into the instruction receivable code when the master control register 203 of the memory means 63 is an initializing completion code. Also, at the same time, in the input/output step 32, the input/output means 51 confirms that the status information of the block condition area 19 of the block management area 112 is an input-/output means access permission when the master control register 202 of the memory means 61 is the operation starting code. Thereafter, as the input/output control instruction of the input/output control area 18 is an output instruction code, the information outputting operation starts from the block area 103 of the memory means 63 into the given position of the fixed disk drive 21 shown with the input/output position parameter of the input/output control area 18 of the block management area 112 of the memory means 61. The information transfer amount at this time becomes a product of the number of the record area 13 stored in the memory means attribute area 15 of the memory means 61 and the capacity, and is stored into the physically continued position of the fixed disk drive 21. After the outputting operation of the information is completed, the input-/output means 51 made the status information of the block condition area 19 of the block management area 112 of the memory means 61 into the master control means access permission. Then, the input/output control register 212 is inputted into the operation completion code.

Then, in the information transfer step 33, the master control means 7 confirms that the status information of the block condition area 19 of the block management area 112 is the master control means access permission when the input/output control register 212 of the memory means 61 is the operation completion code. Thereafter, as the input/output control instruction of the input/output control area 18 is an output instruction code, the storage condition information of the block condition area 19 is made into the unused, and the status information is made into the non-access. Thereafter, the master control register 202 is made into the initializing completion code.

Then, in the input/output step 34, the input/output means 51 makes the input/output control register 212 into the instruction receivable code when the master control register 201 through 204 of the memory means 61 is initializing completion code.

The information transfer of one block area 101 through 104 from the audio converting means 3 into the fixed disk drive 21 is completed. In the same manner, the information transfer from the picture converting means 4 into the fixed disk drive 21, 22, the information transfer from the fixed disk drive 21, 22 into the audio converting means 3 or the picture converting means 4, the information transfer within the fixed disk drive 21 and the fixed disk drive 22 or the same fixed magnetic disk drive 21, 22, or the information transfer between the device and the master control means 7 may be effected.

The number and capacity of the record area 131 through 140 to be used in the input/output step 29, namely, one unit capacity of the information transfer are determined by the transfer speed in the audio converting means 3 of the audio data, the transfer speed of the fixed disk drive 21, and the maximum access time. Namely, at the access time by the fixed disk drive 21, the capacity is required to be more than the capacity where the transferring does not stop in the audio converting means 3.

The input time Ta of the audio information is as follows.

$$Ta = Wt/Va \quad (1)$$

wherein the transfer speed of the audio information is Va, the transfer speed of the fixed disk drive 21 is Vm, the maximum access time of the fixed disk drive 21 is Tm, and the product of the number of the record area 131 through 140 by the capacity, namely, one unit capacity of the information transfer is Wt by the example of the storage onto the fixed disk drive 21 of the audio information. The maximum time Tr for storing the unit capacity Wt of the information transfer in the fixed disk drive 21 is as follows.

$$Tr = Tm + Wt/Vm \quad (2)$$

In order to continuously store the audio information, $$Ta > Tr \quad (3)$$

need only be satisfied. From the (1), (2), (3) equations, $$Wt/Va > Tm + Wt/Vm \quad (4)$$

The unit capacity wt of the information transfer is as follows from the (4) equation.

$$Wt > VaVmTm/(Vm - Va)$$

Assume that the Va is 180 kB/second, the Vm is 1 MB/second, the Tm is 0.07 second, and the Wt becomes approximately 16 kB. In this manner, the unit capacity Wt of the information transfer is selected in accordance with the system situation, so that it becomes possible to effect the continuous input and output operations.

Also, if the capacity of the record area 131 through 140 is a minimum unit necessary for the editing operation such as deletion, insertion and so on, it is possible to efficiently effect not only the inputting and outputting operations of the information, but also the editing operations of the information stored in the fixed disk drive 21.

Also, since the input and output means are prepared independently of the audio and the picture, it is possible to simultaneously effect the inputting and outputting operations of the audio information and the picture information. But as the information transfer step may be performed only with respect to one information at the same time, it is possible to alternately or at a proper ratio in the accordance with the transfer speed perform the information transfer step of the audio information and the picture information by the use of the block management register 12, and to effect the inputting and outputting operations, effecting the synchronizing operation.

Namely, the detection of the starting and completion of the input/output step of the audio information and the picture information, and the waiting for the information transfer step are effected by the use of the master control registers 201 through 204 of the block management register 12, and the input/out control register 211 through 214. By the functions, not only two types of information such as audio and picture, but also many information may be inputted and outputted at the same time so long as the transfer performance of the bus means 8 permits.

Also, the synchronization of the audio and the picture becomes simplified if the capacity of the respective record area 131 through 134 of the audio information and the picture information is determined by the transfer speed of the audio information and the picture information so that the transfer time per capacity of the record area 131 through 134 of the audio information and the transfer time per capacity of the record area 131 through 134 of the picture information may become an integer ratio.

Namely, the conditions of the following equations are satisfied, $$Wb > WraNra \quad (6)$$

$$Wb > WrvNrv \quad (7)$$

wherein Va is the transfer speed of the audio information, Vv is the transfer speed of the picture information, Wb is the capacity of the block areas 101 through 104, Wra is the capacity of the record areas 131 through 140 of the block areas 101 through 104 for the audio information use, Nra is the number, Wrv is the capacity of the record areas 131 through 140 of the block areas 101 through 104 for the picture information use, Nrv is the number. The synchronization of the easier audio and the picture may be realized by the selection of Wra, Na, Wrv, Nv so that the ratio of the Wra/Va and the Wrv/Vv may become an integer ratio. Here, assume that the Vv is n times as large as Va, and the transfer time (WraNra/Va) of one block of the audio becomes the same as the transfer time (WrvNrv/Vv) of the n number of blocks of the pictures if Wra is made one of the n th of Wrv, and Nra is made n time of the Nrv. The synchronization may be effected 1 to n.

In the present embodiment, although the fixed disk drive is used as a memory means for storing and reproducing the digital information capable of random access, an optical disk which is easy to exchange the media and capable of storing and reproducing operations may be used. When the optical disk is used, the stored information may be used not only by one information input/output apparatus, but also by the other information input/output apparatus. By the duplication of the stored digital information, the new package media for freely editing the audio and pictures, and reproducing the edited results at real time may be provided.

Also, in the present embodiment, although the capacity of one block area 101 through 104 is made 16K byte with PCM information being sampled at 40 KHz through 50 KHz as the audio, the picture information of a NTSC system being compressed into approximately 1/50 as the picture, the coping operation may be easily effected down to the limit of the transfer speed of the bus means 8 by the increase in the capacity of the block area 101 through 104, the increase in the number of the memory means, and the increase in the number of the input/output means 51 through 54 when the transfer speed of the information is faster.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An apparatus for the continuous input/output of digital data, comprising:

a plurality of input/output devices respectively including a plurality of random access memory devices for storing and reproducing digital information, an audio information converting device for effecting mutual conversion between analog audio information and digital audio information, and a picture information converting device for effecting mutual conversion between analog picture information and digital picture information;

a plurality of input/output means, respectively operatively coupled to said plurality of input/output devices, for effecting inputting and outputting of the digital information of said plurality of random access memory devices, said audio information converting device and said picture information converting device, respectively;

a plurality of memory means, respectively operatively coupled to said plurality of input/output means, for storing and reproducing the digital information input and output by said plurality of input/output means, respectively;

bus means, operatively coupled to said plurality of memory means such that said plurality of memory means are respectively operatively interposed between said bus means and said plurality of input/output means, for effecting transfer of digital information among said plurality of memory means;

control input means, operatively coupled to said bus means, for generating a control procedure to control storing and reproducing operations of said plurality of memory means; and, master control means, operatively coupled to said bus means, for controlling said control input means and said plurality of memory means;

wherein each of said plurality of memory means includes (a) a memory means management storage area for storing attribute data of a respective input/output device, a respective input/output means and a respective memory means, (b) a plurality of block storage areas each having a same memory capacity for storing digital information transferred among said plurality of memory means by said bus means, each block storage area including an unused memory area and a plurality of record memory areas each having a same memory capacity, (c) a plurality of block management storage areas for respectively storing condition information with respect to said plurality of block storage areas, and (d) a block management register storage area for effecting access synchronization to said master control means and said memory means of said respective input/output means.

2. An apparatus as recited in claim 1, wherein each of said plurality of random access memory devices is a disc memory apparatus and wherein the memory capacity of each block storage area is a multiple of a physically and continually recordable data size of the disc memory apparatus.

3. A method for the continuous input/output of digital data, comprising:

generating digital information using a plurality of input/output devices, including storing and reproducing digital information using a plurality of random access memory devices, effecting mutual conversion between analog audio information and digital audio information using an audio information converting device, and effecting mutual conversion between analog picture information and digital picture information using a picture information converting device;

effecting inputting and outputting of the digital information of said plurality of random access memory devices, said audio information converting device and said picture information converting device, respectively, using a plurality of interface devices, respectively operatively coupled to said plurality of input/output devices;

storing and reproducing the digital information input and output by said plurality of interface devices, respectively, using a plurality of memory devices, respectively operatively coupled to said plurality of interface devices;

effecting transfer of digital information among said plurality of memory means using a bus device, operatively coupled to said plurality of memory devices such that said plurality of memory devices are respectively operatively interposed between said bus device and said plurality interface devices, wherein said storing and reproducing step is effected directly between said respective memory devices and interface devices and not via said bus device;

generating a control procedure to control storing and reproducing operations of said plurality of memory devices using a control input device, operatively coupled to said bus devices; and, controlling said control input device and said plurality of memory devices using a master control device, operatively coupled to said bus means;

wherein each of said plurality of memory means includes (a) a memory means management storage area, (b) a plurality of block storage areas each having a same memory capacity for storing digital information transferred among said plurality of memory means by said bus means, each block storage area including an unused memory area and a plurality of record memory areas each having a same memory capacity, (c) a plurality of block management storage areas and (d) a block management register storage area; and wherein said storing and reproducing step includes storing attribute data of an input/output device, an interface device and a memory device in the memory device management storage area of each respective memory device, storing condition information with respect to the plurality of block storage areas in the block management storage area of each respective memory device, and effecting access synchronization to the master control device and the memory device of the respective interface device.

4. An apparatus as recited in claim 3, wherein each of said plurality of random access memory devices is a disc memory apparatus and wherein the memory capacity of each block storage area is a multiple of a physically and continually recordable data size of the disc memory apparatus.

* * * * *